United States Patent [19]
Kamioka

[11] Patent Number: 6,166,376
[45] Date of Patent: Dec. 26, 2000

[54] MULTI-BEAM SCANNING DEVICE

[75] Inventor: Makoto Kamioka, Kasuga, Japan

[73] Assignee: Matsushita Electric Industrial Co., Ltd., Osaka, Japan

[21] Appl. No.: 09/224,021

[22] Filed: Dec. 31, 1998

[30] Foreign Application Priority Data

Jan. 7, 1998 [JP] Japan ................................ 10-001236

[51] Int. Cl.[7] .............................. H01J 3/14; H04N 1/04
[52] U.S. Cl. ........................................ 250/235; 358/474
[58] Field of Search .................................... 250/234, 235, 250/236; 358/474, 481, 488, 493, 494, 496

[56] References Cited

U.S. PATENT DOCUMENTS 5,883,385  3/1999  Takahashi et al. .................... 250/235

Primary Examiner—Seungsook Ham
Assistant Examiner—Kevin Pyo
Attorney, Agent, or Firm—Stevens, Davis, Miller & Mosher, L.L.P.

[57] ABSTRACT

A multi-beam scanning device in which generation of differences in scanning speed and curved image planes among a plurality of beams is prevented and pitch adjustment for the plurality of beams in the sub-scanning direction can easily be performed. Cylindrical lenses are provided on respective optical paths extending from a plurality of light sources to a beam splitter, and positions of the cylindrical lenses are adjusted by optical path correcting mechanisms for adjustment of position of the respective beams in the sub-scanning direction. A sensor section receives the respective beams to output to a control circuit a detection signal corresponding to a light receiving position. The control circuit drives an optical path correcting drive circuit based on a predetermined threshold and the output signal to control actions of the optical path correcting mechanisms.

8 Claims, 6 Drawing Sheets

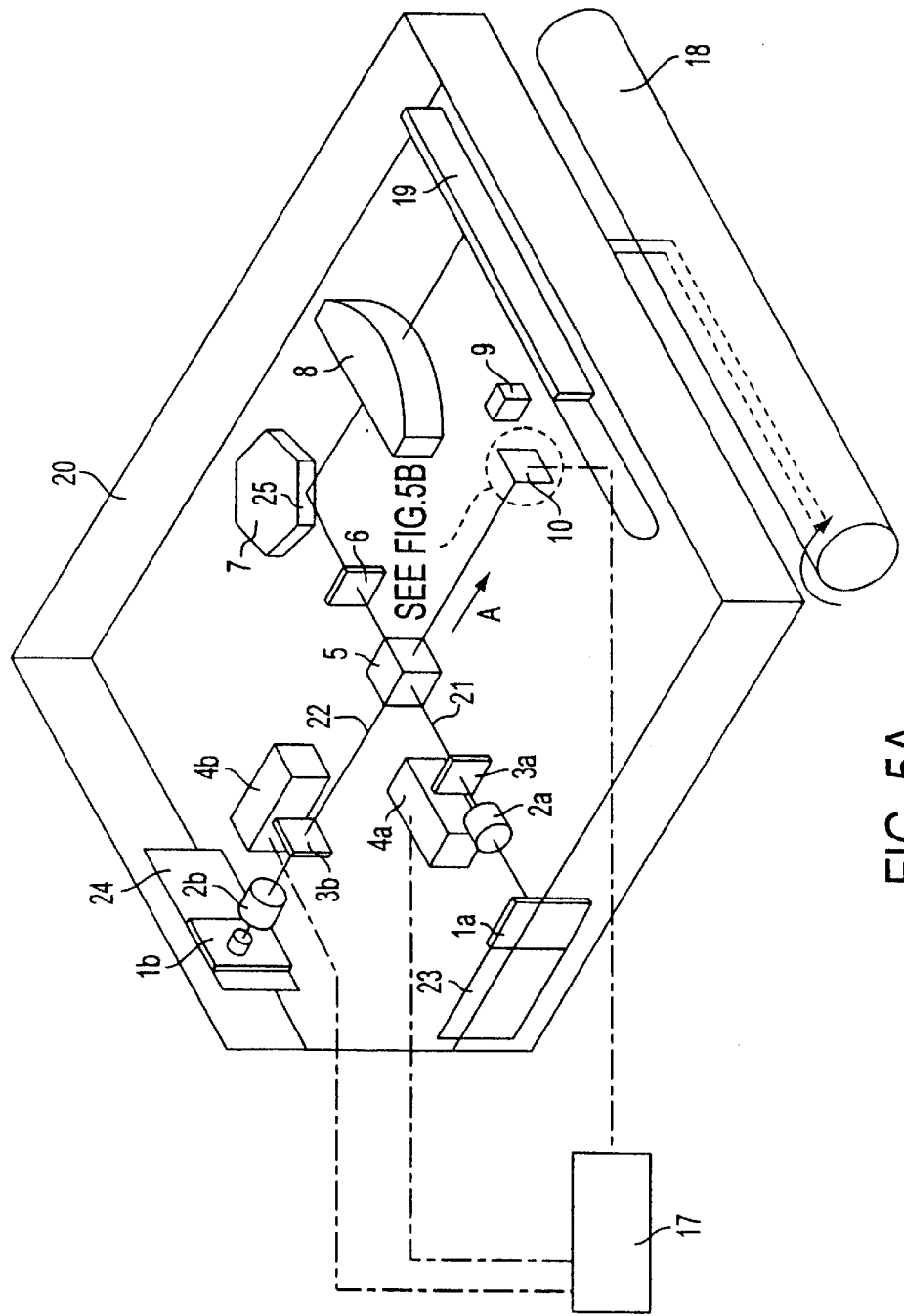
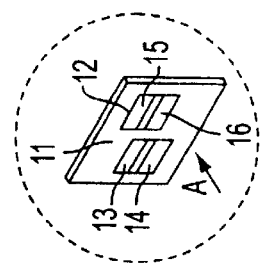
FIG. 5B (PRIOR ART)
FIG. 5A (PRIOR ART)

MULTI-BEAM SCANNING DEVICE

BACKGROUND OF THE INVENTION

1. Field of the Invention

The present invention relates to a multi-beam scanning device constituting exposure means for use in an electronic photographing device in which an image is formed by scanning an image carrier with a plurality of beams.

2. Description of the Related Art

A beam scanning device as exposure means in an electronic photographing device has been heretofore used in writing an image in an electronic photograph process, and mounted on an output device, such as a laser beam printer, of a computer or on a laser facsimile of a facsimile machine and the like. Recently, in order to achieve a high speed operation and a high resolution, there has been increasingly a demand for a scanning optical system by a plurality of beams.

A conventional multi-beam scanning device for emitting a multiplicity of beams will be described hereinafter. FIGS. 5A and 5B show a perspective view of a two-beam scanning device as an example of the conventional multi-beam scanning device. FIGS. 6A and 6B are views showing a state, in which a pitch for two beams is adjusted in a sub-scanning direction.

In FIGS. 5A and 5B, the reference numerals 1a, 1b denote first and second light sources; 2a, 2b denote collimator lenses for transforming beams from the respective light sources into substantially parallel beams; 3a, 3b denote prisms for adjusting the pitch for the beams emitted from the first and second light sources 1a, 1b in the sub-scanning direction; 4a, 4b denote adjustment mechanisms for turning the prisms 3a, 3b; 5 denotes a beam splitter for aligning optical axes of the beams emitted from the respective light sources; 6 denotes a cylindrical lens for converging the beams emitted from the beam splitter 5 in the sub-scanning direction; 7 denotes a deflector provided with a deflecting surface in the vicinity of a converged point of the cylindrical lens 6 for simultaneously deflecting two beams; 8 denotes a scanning lens system for converging the beams deflected by the deflector 7 onto a surface being scanned to perform scanning; 9 denotes a synchronization detector provided in a non-image area on a beam scanning starting side for synchronizing the scanning beams; 10 denotes a sensor section for detecting the pitch interval of two beams in the sub-scanning direction; 11 denotes a divided sensor A mounted on the sensor section 10; 12 denotes a divided sensor B; 13, 14, 15, 16 denote light receiving surfaces of the two divided sensors; 17 denotes a control circuit which turns the prisms 3a, 3b based on a signal from the sensor section 10 to control the pitch of the beams in the sub-scanning direction; 18 denotes a surface being scanned; 19 denotes a mirror for directing the beams to the surface being scanned 18; 20 denotes a housing; 21 denotes the beam from the light source 1a; 22 denotes the beam from the light source 1b; 23 denotes a drive circuit for the light source 1a; 24 denotes a drive circuit for the light source 1b; and 25 denotes a deflecting surface.

The operation of the two-beam scanning device constituted as described above will be described hereinafter.

In FIGS. 5A and 5B, the beams emitted from the first and second light sources 1a, 1b are adjusted by the collimator lenses 2a, 2b to form substantially parallel beams. The prisms 3a, 3b for adjusting a pitch in the sub-scanning direction to a predetermined interval are arranged on optical paths of the respective beams. The prism 3a is used for the changing of the optical path of the beam 21 from the first light source 1a, while the prism 3b is used for the changing of the optical path of the beam 22 from the second light source 1b. The beam splitter 5 coincides the optical axes of the beams 21, 22 transmitted through the prisms 3a, 3b with each other, and the beams are then converged in the sub-scanning direction by the cylindrical lens 6. This is for the purpose of placing the deflecting surfaces 25 and the surface being scanned 18 in an optically conjugate relationship to mitigate an influence of respective surface inclinations which the plurality of deflecting surfaces 25 of the deflector 7 involve.

Since the deflecting surfaces 25 and the surface being scanned 18 have the conjugate relationship in the sub-scanning direction as described above, a pitch for the two beams on the deflecting surface 25 is projected onto the surface being scanned 18 at the magnification of the scanning lens system 8 in the sub-scanning direction. More specifically, the pitch for the two beams on the surface being scanned 18 can be corrected by controlling the pitch for the two beams on the deflecting surface 25.

In order to control the pitch, the detecting sensor section 10 is disposed in the sub-scanning position of each beam. The sensor section 10 is positioned in such a manner that the beam emitted in a direction other than a direction extending from the beam splitter 5 toward the deflecting surface 25 is incident in a position which is optically equivalent to a position where the deflecting surface 25 is disposed.

The sensor section 10 is composed of the divided sensor A11 for positional adjustment of the beam 21 from the first light source 1a and the divided sensor B12 for positional adjustment of the beam 22 from the second light source 1b, and the respective beams are made to register with boundaries of the two divided sensors (a middle of the light receiving surfaces 13, 14 or a middle of the light receiving surfaces 15, 16).

The two divided sensors A11 and B12 are fixed to be offset from each other by a predetermined amount (corresponding to a predetermined pitch on the surface being scanned 18) in the sub-scanning direction. In order that the beam 21 emitted from the first light source 1a be made the divided sensor A11 of the sensor section 10 to register with a predetermined position, the drive circuit 23 allows only the first light source 1a to emit light to radiate the beam 21 to the divided sensor A11. In this case, a signal of the control circuit 17 allows the prism 3a to turn to change an optical path of the beam from the first light source 1a in the sub-scanning direction so that an output from the light receiving surface 13 and an output from the light receiving surface 14 have the same level in terms of intensity of irradiation.

FIG. 6A to 6C are views showing a relationship between beam positions and outputs. For example, when the beam 21 is on the side of the light receiving surface 13 as shown in FIG. 6A, an output level from the light receiving surface 13 is high as compared with that from the light receiving surface 14. On the contrary, when the beam is on the side of the light receiving surface 14 as shown in FIG. 6C, an output level of the light receiving surface 14 is high as compared with that of the light receiving surface 13. Therefore, a difference between the output levels of the light receiving surfaces 13, 14 makes it possible to judge the current beam position and a direction in which the beam should be moved, and the control circuit 17 allows the prism 3a to be turned while controlling the adjustment mechanism 4a.

FIG. 7 shows optical paths in the conventional two-beam scanning device. As shown in FIG. 7, the optical path is changed by the prism 3a such that an angle of the prism 3a is shifted toward the sub-scanning direction to change a position of the beam on the deflecting surface 25 in the sub-scanning direction. Subsequently, as shown in FIG. 6B, at the time when the light receiving surfaces 13 and 14 become the same in output level, turning of the prism 3a is stopped. At this time, a center of the beam 21 is made to register with a boundary of the light receiving surfaces 13, 14.

The similar operation to that described above enables making the beam 22 of the second light source 1b registering with the boundary of the light receiving surfaces 15, 16. Since the boundaries of the divided sensor A11 having the light receiving surfaces 13, 14 and of the divided sensor B12 having the light receiving surfaces 15, 16 are offset a predetermined amount in the sub-scanning direction (corresponding to the predetermined pitch on the surface being scanned 18), the aforementioned adjustment enables the surface being scanned 18 to be scanned with two beams at the predetermined pitch. The adjustment described above is performed before the surface being scanned 18 is scanned with the beams, and the pitch for the two beams is adjusted to the predetermined value.

In practice, when the surface being scanned 18 is to be scanned with the beams, the positions of the two divided sensors A11, B12 are adjusted beforehand at the time of assembly/adjustment. An operation is performed, in which the beams are made to register with predetermined positions of two divided sensors A11 and B12, which have been subjected to the positional adjustment.

Two beams 21, 22 having been adjusted to the predetermined pitch are incident upon the deflector 7 to be converged onto the surface being scanned 18 by the scanning lens system 8 for scanning. Generally, the optical path in the scanning lens system 8 is directed to the surface being scanned 18 by the mirror 19 to make the optical system compact. Two beams, which are made by the deflector 7 to scan, are subjected to synchronization in a main scanning direction by the synchronization detector 9 which is provided in a position this side of a position where the image area is scanned, and irradiation corresponding to the image data is effected with a predetermined timing by the drive circuits 23, 24 of the respective light sources 1a, 1b. Since the surface being scanned 18 is moved in the sub-scanning direction, an image can be formed on the surface being scanned 18 by the two-dimensional irradiation.

FIGS. 8A and 8B are diagrammatic views showing images formed. When the pitch for the beams is adjusted to the predetermined interval as described above, a uniform image can be obtained as shown in FIG. 8A. On the other hand, FIG. 8B shows an image when the beam pitch gets out of position.

As described above, since two beams form an image on the surface being scanned 18, a high-speed or high-resolution beam scanning device can be obtained.

With the aforementioned conventional arrangement, however, the prisms 3a, 3b are turned to change angles, at which beams are incident upon the cylindrical lens 6, thereby adjusting a pitch for two beams. Thus, the two beams are transmitted through the scanning lens system 8 at different incident angles (sub-scanning directions), so that planes, through which the two beams are transmitted, are different in the scanning lens system 8, which is liable to generate curved image planes and differences in scanning speed during the scanning of the surface being scanned 18.

Moreover, since the beam pitch is determined by a predetermined offset of the two divided sensors A11, B12 in the sub-scanning direction, a high mount accuracy is required with respect to the two divided sensors A11, B12, which makes a mounting operation of the sensors difficult. Furthermore, in order to set several kinds of pitches for the two beams, it is necessary to add a corresponding number of divided sensors, which increases cost and disadvantageously makes it difficult to secure a space for the sensor section.

An object of the invention is to provide a multi-beam scanning device which prevents generation of differences in the scanning speed, curved image planes and the like for a plurality of beams and facilitates pitch adjustment of the plurality of beams in the sub-scanning direction.

SUMMARY OF THE INVENTION

To solve the above-described objects, the present invention provides a multi-beam scanning device comprising a plurality of light sources for emitting beams; a plurality of cylindrical lenses provided on respective optical paths of said beams emitted from said plurality of light sources for converging said beams in a predetermined direction; a beam splitter for causing the optical axes of said beams transmitted through the respective cylindrical lenses to coincide with one another; optical means for directing said plurality of beams, of which optical axes are made by said beam splitter to coincide with one another, to a recording medium; scanning means for using said plurality of beams directed by said optical means to effect scanning in a main scanning direction; and optical path correcting means for moving said cylindrical lenses so as to shift positions of the respective beams directed to said recording medium in a sub-scanning direction.

In the multi-beam scanning device of the present invention, the cylindrical lenses are disposed on the optical paths before optical axes are made by the beam splitter to coincide with one another, whereby after the respective cylindrical lenses have adjusted the optical paths of the respective beams, the optical axes are made by the beam splitter to coincide with one another to permit the beams to be directed to the optical means. Therefore, incident angles and incident positions on the lenses included in the optical means can be substantially the same among the respective beams, whereby it is possible to prevent differences in scanning speed among the plurality of beams directed to the recording medium or generation of curved image planes on the surface of the recording medium.

Moreover, in the multi-beam scanning device of the present invention, the beam splitter further directs the plurality of beams, of which optical axes are made to coincide with one another, in a direction different from a direction toward the optical means, detecting means is further provided for receiving the plurality of beams directed in the different directions to detect positions of the respective beams in the sub-scanning direction, and the optical path correcting means moves the cylindrical lenses based on a detection result from the detecting means.

Furthermore, the detecting means comprises a light receiving section for receiving the respective beams to output a detection signal according to a quantity of light received, and a control section for setting a threshold corresponding to the detection signal outputted from the light receiving section when each beam is incident upon a predetermined position on the light receiving section and for controlling an action of the optical path correcting means based on the detection signal and the threshold.

In this case, thresholds are set in the control section according to a position of the light receiving section assembled in the assembly process of the multi-beam scanning device to relax an accuracy for the mount position of the light receiving section to facilitate assembly of the multi-beam scanning device. Moreover, thresholds are set according to the mount position of the light receiving section to enable removing influences of an error in the mount position of the light receiving section based on the detection of positions of the beams in the sub-scanning direction, so that it becomes possible to adjust the positions of the beams in the sub-scanning direction with high accuracy.

BRIEF DESCRIPTION OF THE DRAWINGS

FIGS. 5A and 5B show a perspective view showing a two-beam scanning device constituting an example of the conventional multi-beam scanning device;

DESCRIPTION OF THE PREFERRED EMBODIMENTS

Figure 1B:
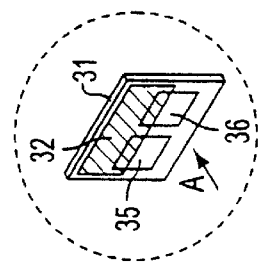
FIGS. 1A and 1B show a perspective view showing a multi-beam scanning device according to an embodiment of the present invention.
Figure 1A:
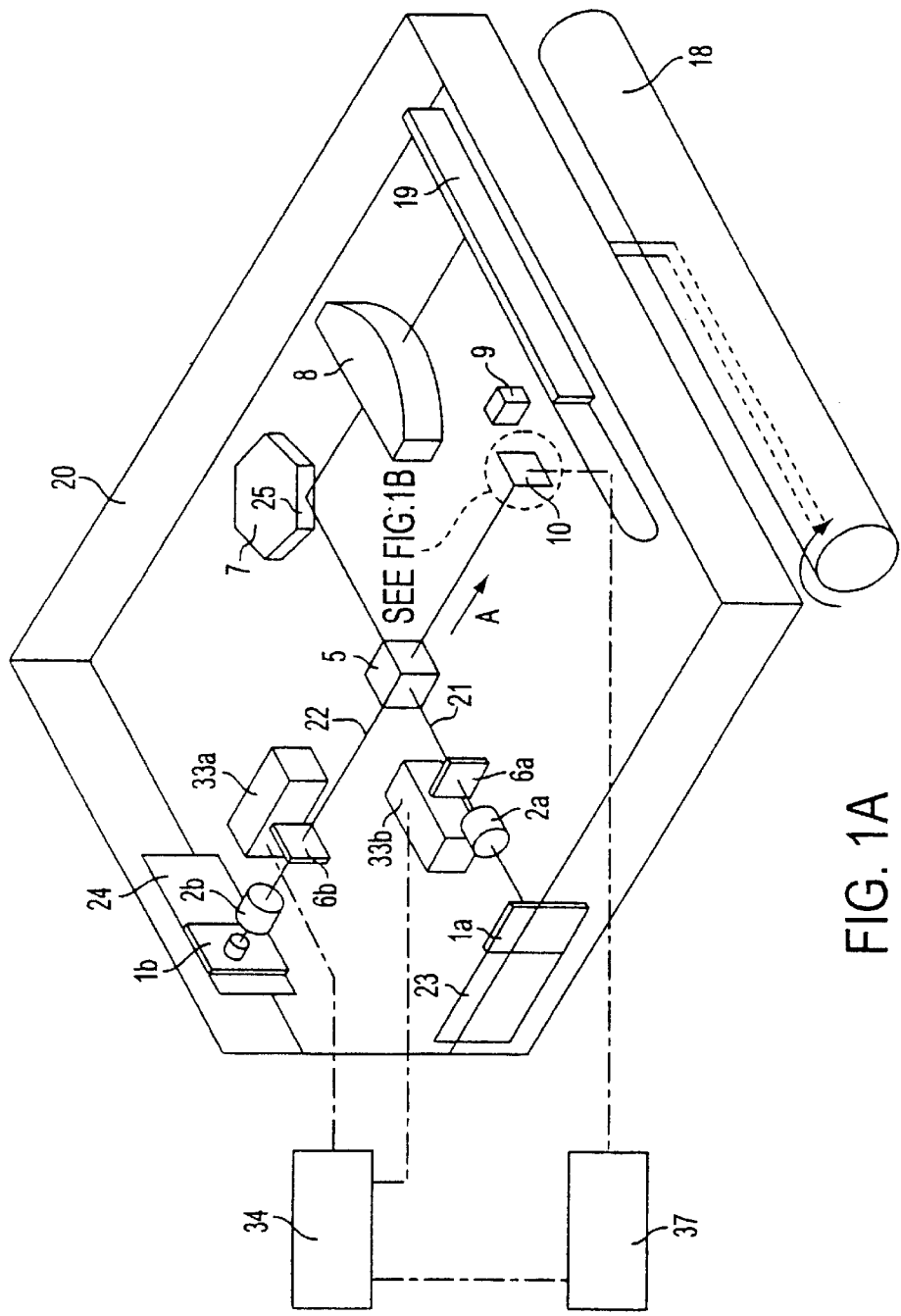

An embodiment of the invention will be described hereinafter. FIGS. 1A and 1B show a perspective view showing a multi-beam scanning device according to an embodiment of the present invention.

In FIGS. 1A and 1B, the reference numerals 1a, 1b denote first and second light sources; 2a, 2b denote collimator lenses for transforming beams from the light sources into substantially parallel beams; 6a, 6b denote cylindrical lenses for converging the beams in a sub-scanning direction; 5 denotes a beam splitter for coinciding optical axes of the beams emitted from the two light sources 1a, 1b with each other; 7 denotes a deflector for deflecting the beams; 25 denotes deflecting surfaces of the deflector 7; 8 denotes a scanning lens system for converging deflected beams onto a surface being scanned 18 to form an image; 19 denotes a mirror for directing the beams to the surface being scanned; 9 denotes a synchronization detector for detecting synchronization of the respective beams; 18 denotes a surface being scanned; 10 denotes a sensor section provided in a position optically equivalent to a position where the deflecting surface 25 of the deflector 7 put into action is positioned; 31 denotes a photo sensor; 32 denotes a knife edge; 32a denotes an edge portion of the knife edge 32; 33a, 33b denote optical path correcting mechanisms for moving the respective cylindrical lenses 6a, 6b in the sub-scanning direction; 34 denotes an optical path correcting drive circuit for driving the optical path correcting mechanisms 33a, 33b; 35, 36 denote light receiving surfaces of the photo sensor 31; 37 denotes a control circuit for controlling the optical path correcting drive circuits 33a, 33b based on a signal from the sensor section 10; 20 denotes a housing; 21 denotes a beam emitted from the light source 1a; 22 denotes a beam emitted from the light source 1b; 23 denotes a drive circuit for the light source 1a; and 24 denotes a drive circuit for the light source 1b.

In the embodiment, the scanning lens system 8 and the mirror 19 constitute optical means of the invention, the deflector 7 and the synchronization detector 9 constitute scanning means, the optical path correcting mechanisms 33a, 33b and the optical path correcting drive circuit 34 constitute optical path correcting means, and the sensor section 10 and the control circuit 37 constitute detecting means.

An operation of the two-beam scanning device constituted as described above will be described below. Additionally, an operation for scanning the surface being scanned 18 with beams is the same as that of the conventional example, and so an operation for adjustment of a pitch between two beams in the sub-scanning direction will be described.

Figure 6A:
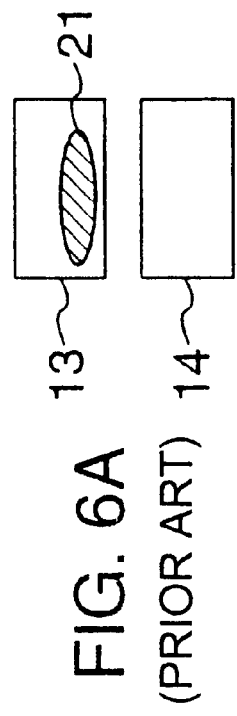
FIGS. 6A, 6B, 6C are views showing states, in which an interval pitch of two-beam is adjusted in a sub-scanning direction.
Figure 6B:
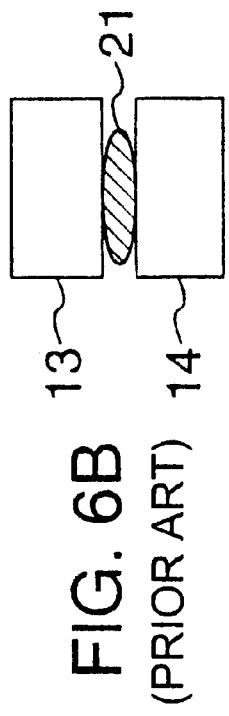
Figure 6C:
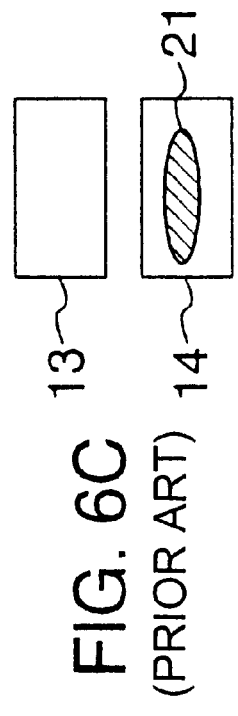
Figure 7:
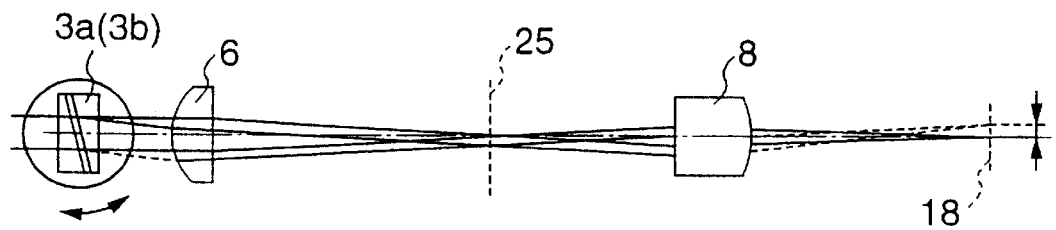
FIG. 7 is a view showing optical paths in the conventional two-beam scanning device.
Figure 8A:
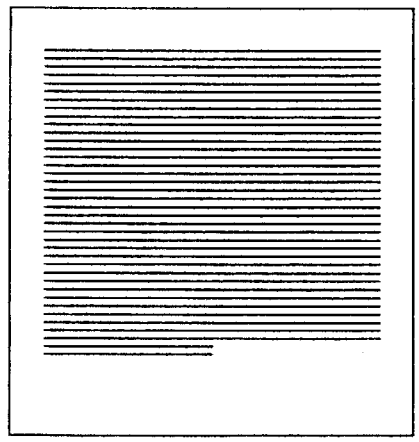
FIGS. 8A and 8B are diagrammatic views showing images formed.
Figure 8B:
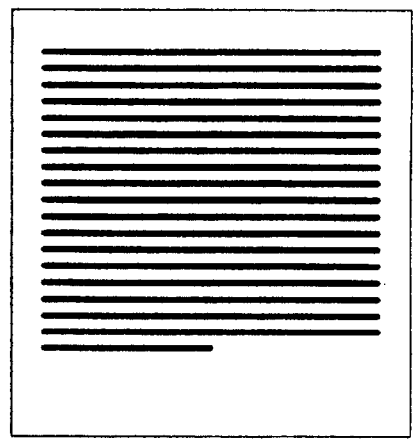

In the same manner as in the conventional two-beam scanning device shown in FIGS. 5 to 7, a beam pitch is adjusted by adjusting a pitch on the deflecting surface 25 of the deflector 7 to a predetermined interval. The pitch adjustment on the deflecting surface 25 is effected such that the cylindrical lenses 6a, 6b positioned on the optical paths of the respective beams 21, 22 are moved in the sub-scanning direction by the optical path correcting mechanisms 33a, 33b so that outputs from the sensor section 10 become predetermined values. The adjustment operation is performed before the surface being scanned 18 is scanned with beams.

First, a beam serving as a reference is adjusted in position in the sub-scanning direction. The beam 21 from the first light source 1a is used as the reference. The drive circuit 23 of the first light source 1a permits the first light source 1a to emit the beam 21. The beam 21 emitted is transmitted through the collimator lens 2a, the cylindrical lens 6a and the beam splitter 5 to be separated into a beam directed to the deflecting surface 25 of the deflector 7 and a beam directed to the sensor section 10. The beam directed toward the deflecting surface 25 is used for irradiation of the surface being scanned 18, and the beam directed toward the sensor section 10 is conducted to the light receiving surface 35 for positional detection.

Figure 2:
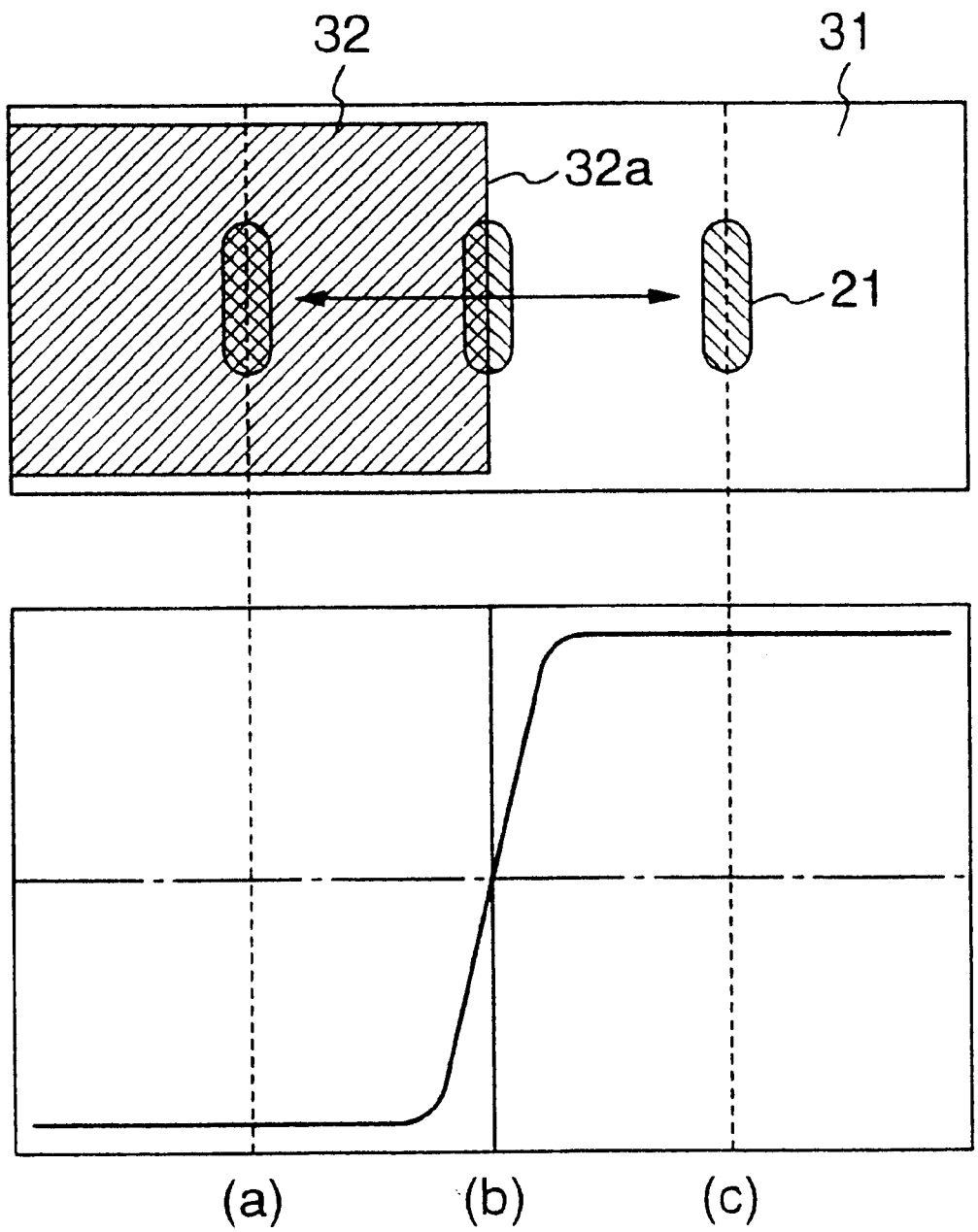
FIG. 2 is a diagrammatic view showing a state, in which a beam is incident upon a sensor section.

FIG. 2 is a diagrammatic view showing a state, in which beams are incident on the sensor section. The light receiving surface 35 on the sensor section 10 is provided with the knife edge 32 which serves as a reference for registering the beams with an approximate position. When the beam 21 from the first light source 1a approaches the knife edge 32, the beam is interrupted by the knife edge 32 before reaching the light receiving surface 35 to be reduced in quantity of light, so that an output level from the light receiving surface 35 decreases. More specifically, positions of the knife edge 32 and of the beam 21 in the sub-scanning direction can be known by an output from the photo sensor 31.

As shown in FIG. 2, an output of the photo sensor 31 is low in a position (a) where the beam 21 is completely interrupted by the knife edge 32, amounts to about a half of a maximum output in a position (b) where a center of the beam is disposed on the edge portion 32a of the knife edge 32, and exhibits the maximum output in a position (c) where the beam departs from the knife edge 32 and most of the beams 21 is incident upon the light receiving surface 35. When the center of the beam approaches the knife edge 32 (the position b), the sensor rapidly changes in output. Since the output level is sharply responsive to a position of the beam in the vicinity of the knife edge 32, the position of the beam undergoes less scattering even if the output level includes some noises.

Since the knife edge 32 is in a position optically equivalent to a position where the deflecting surface 25 is disposed, the cylindrical lens 6a reduces the beam positioned on the knife edge 32 small in diameter in the sub-scanning direction. Therefore, the output level rapidly changes depending upon the position of the beam in the vicinity of the knife edge 32. When the output of the photo sensor 31 is a half of the maximum output, the center of the beam coincides with a position where the edge portion 32a of the knife edge 32 is disposed. So, a value of a half of the sensor output of the photo sensor 31 may be theoretically taken as a threshold value for the beam position adjustment.

In an actual assembly, however, the knife edge 32 of the sensor section 10 is positioned to be somewhat offset from a desired normal position. Moreover, it is difficult to correctly set an output of the sensor to a half of the maximum output.

To cope with such difficulty, the beam 21 from the first light source 1a is adjusted to an approximate position where the knife edge 32 is disposed so that an output from the photo sensor 31 takes a threshold which amounts to about a half of the maximum output. In short, it suffices to enable keeping the second beam at a predetermined pitch based on a position where the first beam is located, and it is not necessary to make the beam 21 correctly coincide with the edge portion 32a of the knife edge 32.

Figure 3:
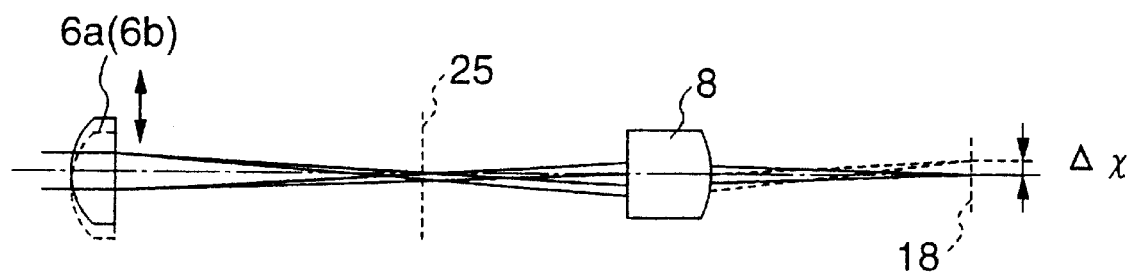
FIG. 3 is a view showing optical paths in the multi-beam scanning device.

The beam 21 is adjusted in position as follows:

FIG. 3 shows optical paths in the multi-beam scanning device. Here, "level H" designates outputs which are high in level relative to the set threshold, and "level L" designates outputs which are low in level relative to the set threshold. In FIGS. 2 and 3, the optical path correcting drive circuit 34 actuates the optical path correcting mechanism 33a to move the cylindrical lens 6a so that an output produced upon incidence of the beam 21 amounts to the level L. When the output has changed from the level H to the level L, the operation of the optical path correcting mechanism 33a is stopped. Also, when the output produced upon incidence of the beam 21 amounts to the level L, the optical path correcting circuit 34 actuates the optical path correcting mechanism 33a in an opposite manner to the above to move the cylindrical lens 6a so that the output produced upon incidence of the beam amounts to the level H. Subsequently, when the output changes from the level L to the level H, the operation of the optical path correcting mechanism 33a is stopped.

In addition, in order to constantly move the beam 21 in the same direction, the beam 21 is preferably adjusted in position so that the beam 21 is moved after the beam 21 is first moved to the position corresponding to the level L, and the operation of the optical path correcting mechanism 33a is stopped when the output has changed from the level L to the level H. In this case, it is possible to suppress influences of hysteresises of the mechanism section of the optical path correcting mechanism 33a (33b) or the circuit for determining the threshold and output level of the photo sensor 31, thus enabling reducing dispersion in the positional adjustment.

The beam 21 from the first light source 1a having been adjusted in position is irradiated on the surface being scanned 18 by the deflector 7, and is identified with respect to position by a detecting sensor (not shown) which is provided on the surface being scanned 18 for detecting the position in the sub-scanning direction. The position of the beam 21 from the first light source 1a is used as a reference for positioning the beam 22 from the second light source 1b. Additionally, the operation for identifying the beam position and adjusting the threshold is performed during the assembly/adjustment of the optical system. For the optical system actually incorporated in a product, however, only an operation for adjusting the beams in accordance with the set thresholds is performed.

Subsequently, the first light source 1a is made to stop emission of beam, and only the beam 22 is emitted from the second light source 1b to be subjected to adjustment in the same manner as the beam adjustment in the first light source 1a. However, the beam 22 from the second light source 1b must be maintained at a predetermined pitch using the beam position of the first light source 1a as a reference. Thus, the beam 22 from the second light source 1b is irradiated on the surface being scanned 18, and the photo sensor 31 for detecting positions in the sub-scanning direction is used to detect a position of the beam 22 on the surface being scanned. Subsequently, the optical path correcting mechanism 33b is actuated to move the beam 22 to a position on the surface being scanned 18, spaced a predetermined pitch from the position (reference position) of the beam 21 of the first light source 1a. An output level from the photo sensor 31 with the beam 22 in that position is set as a threshold value.

Figure 4:
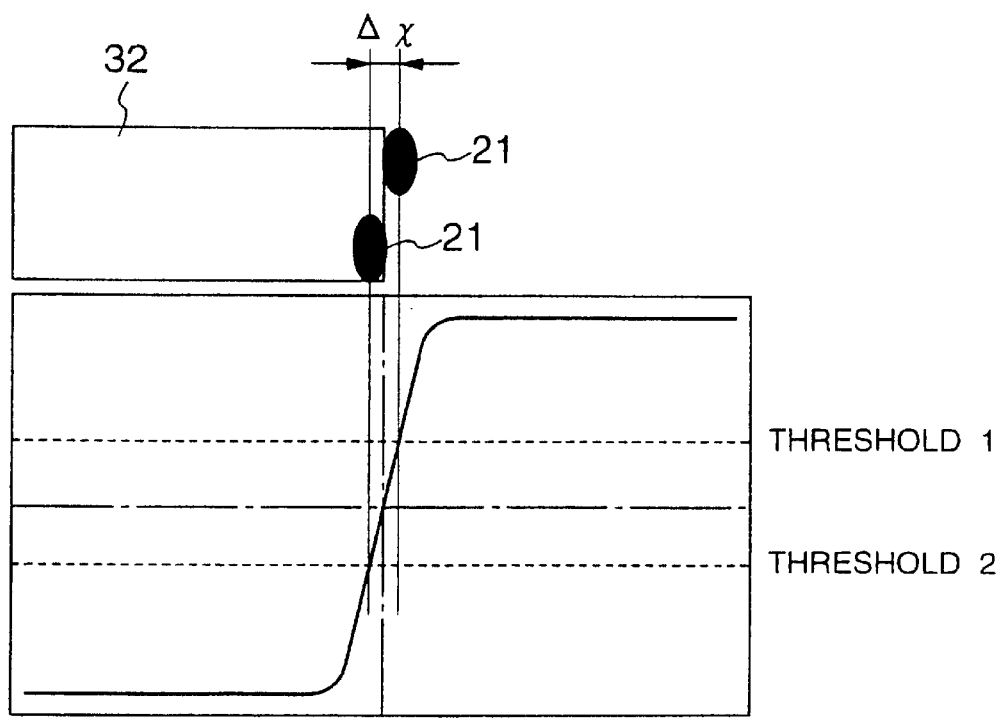
FIG. 4 is a view illustrating a positional adjustment of two beams.

FIG. 4 is a view illustrating how two beams are adjusted with respect to position. FIG. 4 shows the manner in which positions of beams can be delicately changed by changing the threshold. More specifically, thresholds 1 and 2 can be used to place the beams in positions with an interval of DDX. As described above, varying the threshold and adjusting the positions of the beams can relax the mount accuracy of the sensor section 10, make the pitch highly accurate, and easily adjust the beams to the intended positions.

Moreover, the pitches of two beams can be made consistent with each other by moving the cylindrical lenses 6a, 6b by about several tens microns in the sub-scanning direction. Therefore, a plurality of beams are substantially made the same in the position and incident angle of the main beam incident upon the scanning lens system 8. Thus the plurality of beams are transmitted through substantially the same transmission plane of the scanning lens system 8, so that differences in the scanning speed and curvature of the image plane with the scanning lens system 8 can be reduced to suppress deterioration of images.

Furthermore, when two threshold levels (e.g., threshold levels at which sub-scanning pitches correspond to of 300 DPI and 600 DPI) for adjusting the beam 22 from the second light source 1b are set, the pitch is changed with the selected threshold to enable irradiation of the beams with the resolution in the sub-scanning direction changed.

In the prior art, in the case where the multi-beam scanning device with a pitch fixed to 300 DPI is used for 600 DPI, it is required that one beam is used to reduce the movement speed of the surface being scanned 18 to ¼, or the speed of one beam per scanning is increased four times. Therefore, merits of multi-beam scanning are lost.

In contrast, according to the present invention, a pitch is selected from 300 DPI or 600 DPI, and so scanning can be performed in accordance with either pitch. Therefore, two beams are used to reduce the movement speed of the surface being scanned 18 to ½, or the beam speed per scanning is increased twice, so that it is possible to make the use of merits of the multi-beam scanning.

Furthermore, the photo sensor 31 of the sensor section 10 can use a single light receiving surface for adjustment of two pitches. Thus, two beams can be adjusted with respect to pitches in sub-scanning by selecting different thresholds for the photo sensor and adjusting the pitches with each threshold. For example, the beam from the first light source 1a is adjusted in accordance with the first threshold level while the beam from the second light source 1b is adjusted in accordance with the second threshold level. Setting of the thresholds are performed by varying the second threshold while monitoring the position detecting sensor placed on the surface being scanned 18.

Moreover, there can be provided thresholds corresponding to a plurality of pitches. The use of one light receiving surface enables ensuring a large light receiving area whereby positions of beams can be determined with a larger quantity of light as compared with the case where a plurality of light receiving surfaces are used. Thus, it becomes possible to enhance a S/N ratio of the sensor output, reduce fluctuation in the sensitivity of the photo sensor, and save space and cost for the sensor section.

While the two-beam scanning has been described above, the invention can be applied to three or more beam scanning in the same manner.

With the aforementioned arrangement, it is possible to reduce differences in scanning speed and curvature of image planes among beams in the multi-beam scanning device in which a plurality of beams are simultaneously used for scanning and to facilitate assembly of the device and adjustment of pitches in the sub-scanning direction with accuracy.

As described above, according to the present invention, means for adjusting an optical path of each beam before optical axes of beams emitted from a plurality of light sources are made to coincide with one another is provided whereby differences in scanning speed and curvature of image planes among the respective beams and the scanning speed difference between the beams can be reduced on the surface of a recording medium.

Moreover, according to the present invention, thresholds for detection signals from the detecting means are set for the respective beams, and are used to adjust positions of the optical paths, whereby a multi-beam scanning device can be obtained in which the detecting means is relaxed in mount accuracy and can easily be assembled.

What is claimed is:

1. A multi-beam scanning device comprising a plurality of light sources for emitting beams; a plurality of cylindrical lenses provided on respective optical paths of said beams emitted from said plurality of light sources for converging said beams in a predetermined direction; a beam splitter for causing the optical axes of said beams transmitted through the respective cylindrical lenses to coincide with one another; optical means for directing said plurality of beams, of which optical axes are made by said beam splitter to coincide with one another, to a recording medium; scanning means for using said plurality of beams directed by said optical means to effect scanning in a main scanning direction; and optical path correcting means for moving said cylindrical lenses so as to shift positions of the respective beams directed to said recording medium in a sub-scanning direction.

2. The multi-beam scanning device according to claim 1 wherein said beam splitter further directs said plurality of beams, of which optical axes are made to coincide with one another, in a direction different from a direction toward said optical means, detecting means is further provided for receiving said plurality of beams directed in said different direction to detect positions of the respective beams in the sub-scanning direction, and said optical path correcting means moves said cylindrical lenses based on a detection result from said detecting means.

3. The multi-beam scanning device according to claim 2 wherein said detecting means comprises a light receiving section for receiving the respective beams to output a detection signal according to a quantity of light received, and a control section for setting a threshold corresponding to the detection signal outputted from said light receiving section when each beam is incident upon a predetermined position on said light receiving section and for controlling an action of said optical path correcting means based on said detection signal and said threshold.

4. The multi-beam scanning device according to claim 3 wherein a plurality of said light receiving sections are provided corresponding to said plurality of beams directed from said beam splitter, and said control section sets one or more thresholds every said light receiving section.

5. The multi-beam scanning device according to claim 3 wherein a single said light receiving section is provided, and said control section sets a plurality of thresholds corresponding to the respective beams for said light receiving section.

6. The multi-beam scanning device according to claim 3 wherein said light receiving section comprises an interruption area for interrupting the passage of incident beams.

7. The multi-beam scanning device according to claim 4 wherein said light receiving section comprises an interruption area for interrupting the passage of incident beams.

8. The multi-beam scanning device according to claim 5 wherein said light receiving section comprises an interruption area for interrupting the passage of incident beams.

* * * * *